April 4, 1961     I. J. JENSEN     2,977,992
STOPPER FOR GAS LINES AND THE LIKE
Filed May 16, 1958     2 Sheets-Sheet 1
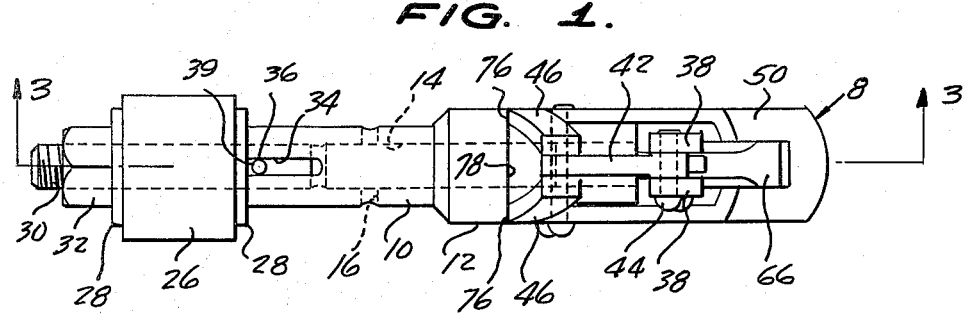
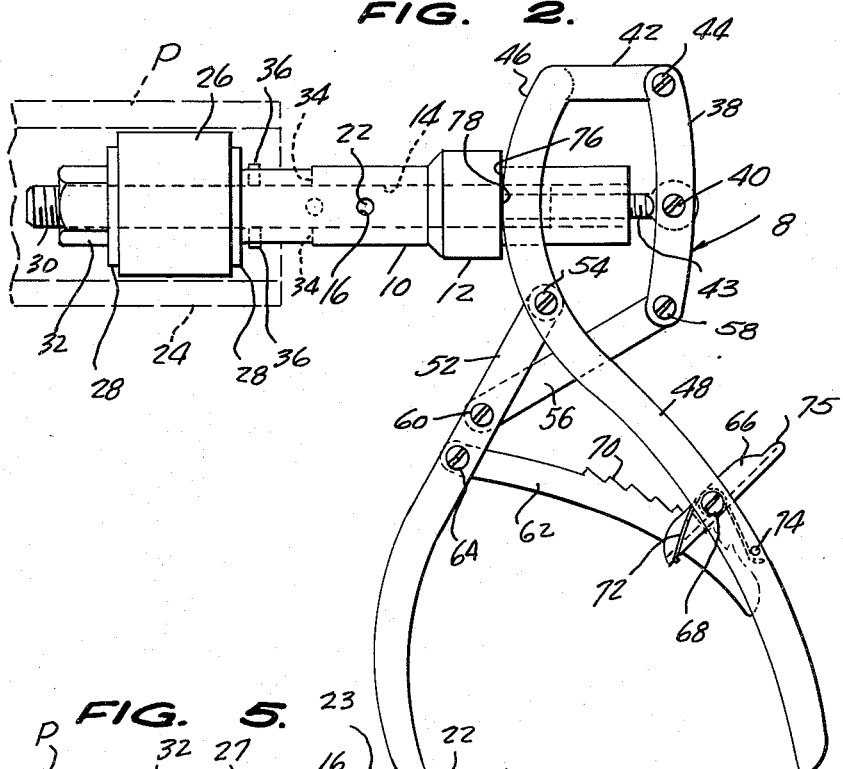
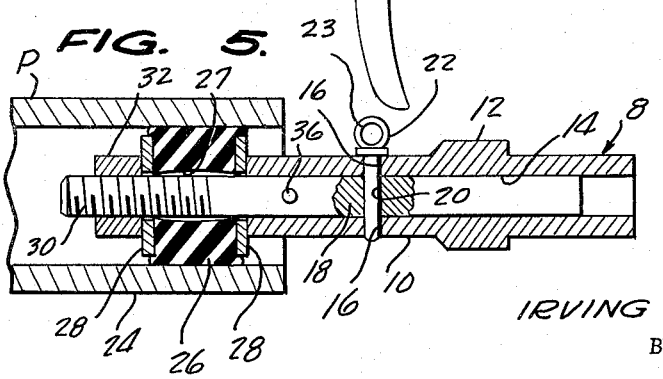
INVENTOR.
IRVING J. JENSEN,
BY
McMorrow, Berman & Davidson
ATTORNEYS.

April 4, 1961 — I. J. JENSEN — 2,977,992
STOPPER FOR GAS LINES AND THE LIKE
Filed May 16, 1958 — 2 Sheets-Sheet 2
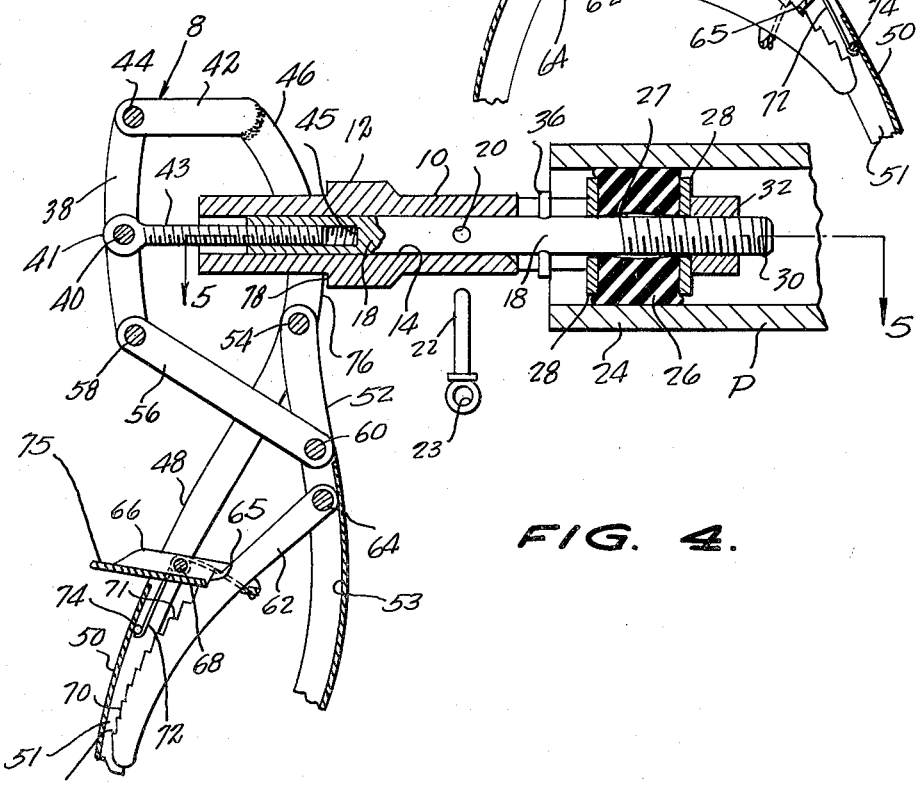
INVENTOR.
IRVING J. JENSEN,
BY
McMorrow, Berman & Davidson
ATTORNEYS.

United States Patent Office 2,977,992
Patented Apr. 4, 1961

2,977,992

STOPPER FOR GAS LINES AND THE LIKE

Irving J. Jensen, 910 Highland Ave., Iowa City, Iowa

Filed May 16, 1958, Ser. No. 735,787

2 Claims. (Cl. 138—89)

This invention relates generally to stopper or plug devices, adapted for insertion in a line through which gas or other fluid substances pass, to halt the flow of the gas during the performance of various types of maintenance or repair operations on the line.

Hereinafter the invention will be described with particular reference to its use as a stopper for gas lines, that is, lines through which flow natural or manufactured gas. However, it will be understood that the device has general utility as a stopper for any line through which a fluid, whether gaseous or liquid, passes.

The invention has, as one important object thereof, the provision of means for swiftly operating a resilient plug element to an axially compressed, line-stopping position, through the medium of a novelly designed linkage incorporated in the invention.

Another object is to so form the linkage that on operation of same to a position in which it will radially expand the plug element, the linkage will releasably lock to hold said element in its radially expanded position.

Another object is to so form the device that the element-expanding linkage, after being locked, can be swiftly removed bodily from the portion of the device that is in plugging relation to the line. In this way, the linkage can be used for the expansion or removal of other plug elements, while the plug element to which it was previously connected remains in line-stopping position for as long as is necessary to the performance of the particular maintenance or repair operation.

A further object of importance is to provide a device of the character stated which will be adapted for manufacture at a comparatively low cost, considering the decided advantages possessed thereby when compared to other stoppers for gas lines previously conceived.

Yet another object is to so form the plug element expanding means as to incorporate therein a pronounced mechanical advantage such as to produce a very considerable force radially expanding the plug element, in relation to easy operation of the expansion means.

Another object is to provide a device of the character stated which can be used in gas lines of varying dimensions, without requiring modification or redesign of the invention.

Other objects will appear from the following description, the claims appended thereto, and from the annexed drawings in which like reference characters designate like parts throughout the several views and wherein:

Figure 1 is a top plan view of a stopper according to the present invention;

Figure 2 is a side elevational view thereof with the plug element in its normal, non-stopping position, a pipe being shown fragmentarily and in dotted lines;

Figure 3 is a longitudinal sectional view of the device, substantially on line 3—3 of Figure 1;

Figure 4 is a longitudinal sectional view of the device with the plug element expanded radially; and Figure 5 is a longitudinal sectional view substantially on line 5—5 of Figure 4.

Referring to the drawing, the illustrated device, generally designated by the numeral 8, is shown in association with a pipe P constituting a part of a gas line.

The device 8 includes a sleeve or barrel 10 of elongated cylindrical formation integrally formed intermediate its ends with an external annular shoulder 12. The sleeve 10 has a straight, end-to-end axial bore 14 opening to the first and second ends of the sleeve. Formed in the sidewall of the sleeve between the shoulder 12 and the forward or first end of the sleeve are transversely-aligned openings 16 through which is engageable a locking pin 22 having a handle loop 23 on its outer end. A plunger rod 18 slides in the sleeve bore 14 and has intermediate its ends a diametrically-extending bore 20 registrable with the opening 16 to receive a locking pin 22.

The pipe P is in the form of a straight, tubular member 24, and in use of the device, a cylindrical plug element 26 formed of a soft rubber or other resilient material is adapted to be radially expanded within the member 24, to prevent flow of fluid therefrom. Plug element 26 has a centrally disposed, end-to-end bore 27 receiving the forward portion 30 of the rod 18, which forward portion projects beyond the forward end of the sleeve 10.

Circumposed on the forward portion of the rod 18 in engagement with opposite ends of the plug 26 are flat metal washers 28. A nut 32 is threaded on the portion 30 and bears against the forward washer 28. The rear washer 28 can abut the forward end of barrel or sleeve 10, as clearly shown in Figures 3 and 5.

In the outer end of the portion 30 are a pair of diametrically-opposed longitudinal slots 34, Figures 1 and 3, which receive the ends of a cross pin 36 that extends through a transverse opening 37 of the rod 18. Obviously, the rod may be simply integrally formed with diametrically opposed radial lugs instead of having a cross pin 36. It is mainly important to note that whichever construction be adopted, there will still be provided diametrically opposite, radially outwardly extending lugs 39, to engage in the slots 34 for holding the rod 18 against rotation relative to the barrel during longitudinal movement of the rod and the barrel relative to each other.

Means is incorporated in the device adapted to produce expansion of the plug 26 by compressing the same endwise so as to sealingly plug the open end of the pipe in which the plug is inserted. A threaded stud 43 is threaded into a rearwardly-opening axial bore 45 in the rear end of the stem 18, and has an eye 41 on the outer end.

A pair of laterally open rock arms 38 are provided intermediate their ends, as at 40 on the eye 41, and are located at opposite sides of the eye. The arms 38 are pivotally connected at one end to the adjacent end of arm 42 by a pin 44. Arm 42 at its forward end is disposed between and is welded or otherwise fixedly connected to the upper ends of elongated, longitudinally-curved main levers 46 having elongated lower end portions 48 which are connected together by a web 50 so as to define at the lower ends of the main arms a forwardly-opening channel 51.

An operating lever 52 has an upper end pivotally connected at 54 to levers 46, a short distance below the barrel 10, the arms 46 above the pivot 54 being oppositely outwardly-bowed so as to embrace and clear the barrel 10 immediately rearwardly of the shoulder 12.

The operating lever 52 which is provided with a channeled lower end portion 53 is pivoted intermediate its ends at 60 to the lower end of a link 56, the other end of which is pivotally connected at 58 to and between the lower ends of the rock arms 38.

An elongated curved locking arm 62 has a front end pivotally connected at 64 to lever 52 at a point below and near to the pivot pin 60. Arm 62 declines rearwardly from the operating lever 52 toward the lever 48 and extends through a longitudinal slot 65 formed in the end of a channel locking pawl 66 which is disposed between the levers 48 and is pivotally connected thereto intermediate its ends by a pivot pin 68.

An upstanding series of ratchet teeth 70 are formed on the upper edge of locking arms 62 defining notches 71 any one of which is adapted to receive the closed end of the slot 65, as shown in Figure 4.

A torsion spring 72 has a coil intermediate its ends engaged about pivot pin 68. One end of spring 72 is engaged about a lug 74 provided in the channel member 51 below locking pawl 66. The other end of the spring has a lateral extension engaging under the slotted end of the locking pawl. The spring is tensioned to normally bias the pawl into engagement with the notches 71 on the locking arm. Against the resistance of the spring upon manual pressure exerted on a rearwardly projecting, handle-defining end portion 75 of pawl 66, can turn the pawl counter-clockwise in Figure 4 and disengage the same from the locking arm 62.

In use, initially the device appears as in Figures 1, 2 and 3.

Before use, of course, certain adjustments can be made in the normal position of the parts. For example, the nut 32 is threaded along the stem to an extent sufficient to bring the abutment plates 28 firmly against the opposite ends of the plug element 26 with the linkage in its normal, spread, unlocked position shown in Figure 3. Further, the linkage can be adjusted with respect to the angularity of the parts when they are in their normal position, by means of the stud 43, that is, the pivot pin 40 can be adjusted rearwardly from the rear end of the stem to any selected extent found desirable.

It is to be noted that the arms 46 have forwardly bowed upper end portions 76 (see Figure 2) adapted to bear against the rear edge of the collar, said rear edge of the collar defining a shoulder or abutment 78.

At this time, the drop pin 22 is not in its Figure 5 position. Instead, it is removed from the openings 16, 20 so as to permit free relative axial displacement of the barrel and stem.

The plug element is now inserted in the pipe, and initially is of a diameter slightly less than the inner diameter of the pipe so as to permit free insertion of the plug element. This is shown in Figure 2. Then, one grasps the lower end portions of the lever 52 and member 51, which define downwardly divergent handles. These are shifted toward each other from their normal, widely spread position shown in Figures 2 and 3 to their locking position shown in Figure 4 wherein they are relatively closely spaced apart.

The arms 46, when moved toward the lever 52, slidably contact the lower end portion of the arm 62, to swing the same downwardly about its pivot 64. When the handles are being brought toward each other from their Figure 2 to their Figure 4 position, the pawl ratchets forwardly over succeeding notches 71 and automatically locks in one of said notches when the plug has been expanded to the desired dimension.

When the handles move toward each other in this manner, the link 56 moves rearwardly, that is, to the left in Figure 4. This tends to rock rock arms 38 clockwise about their axis 40 viewing the same as in Figure 4. This in turn tends to shift the extension 42 forwardly. Forward movement of the extension is prevented, however, by the forwardly bowed portions 76 of arms 46 engaging against the shoulder 78.

Therefore, as the link 56 continues its rearward movement, the rock arms 38 are swung to the left in Figure 4, clockwise about their pivot 44, the pivot 44 remaining in effect relatively immovable. Therefore, rearward movement of the stud 43 and stem 18 results, that is, the stem moves to the left in Figure 4. Abutment 28 shown at the right in Figure 4 is shifted with the stem and with the nut 32 to the left in Figure 4. Abutment 28, shown at the left in the same figure however, does not move, since it bears against the barrel 10. This causes the plug element 26 to be axially compressed, radially expanding the same into sealing engagement with the wall of the pipe P.

To disconnect the plug 26 from a conduit or pipe 24, it is only necessary that the operator move the handles slightly toward each other, while rocking the pawl out of its notch 71 in a counter-clockwise direction. The handles now may be moved relatively away from each other.

On release of the handles, they will lock in the position to which they are moved toward each other, by reason of the fact that the spring 72, tending to expand, rocks the pawl 66 to its Figure 4 position, causing the tooth 65 to engage in the nearest notch 71.

It will be apparent that the tool can now be released and plug element 26 will be retained in its radially expanded, sealing condition. If, however, it is desired to leave the plug element in the pipe during the performance of repair operation, one can disengage the entire operating assembly, while leaving the plug element in the pipe in its expanded condition. This is done by inserting the pin 22 through the now registered openings 16, 20 (see Figure 5). These openings, it should be noted, register when the plug element is radially expanded to a sealing position.

When the pin has been inserted, one can rotate the entire operating linkage bodily with the stud 43, to back the stud out of the recess 45. The operating linkage can then be engaged with another stem 18 having its own plug element, so that the same operating linkage can be used with a complete set of stems and plug elements, to permit a plurality of pipes to be plugged, the plugs remaining in the pipes and the operating linkage being removed each time a plug element has been radially expanded into a sealing position. Subsequently, one can remove the plug elements merely by taking out the pins. The removal of the pins, at this time, will eliminate the compressive force exerted upon the plug element by the abutment plates 28, so that the plug element immediately loses its compression and retracts from sealing position to permit removal of the same from the pipe.

It is believed apparentt that the invention is not necessarily confined to the specific use or uses thereof described above since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claims.

What is claimed is:

1. In a pipe plug, a barrel having an axial bore and first and second ends to which the bore opens, a rod sliding in said bore and having a first end portion extending beyond said first end of the barrel, said rod having a second end, a threaded axial bore in said rod opening to said second end, a stem having a first end threaded in said threaded bore and a second end extending beyond said second end of the barrel, a transverse rock arm pivoted intermediate its ends on the second end of the stem, said rock arm having first and second ends, a relatively stationary lever having first and second end portions, said first end portion extending along side of the barrel and terminating in a fixed lateral arm pivoted to the first end of the rock arm, an operating lever having first and second ends with its first end pivoted to the first end portion of the stationary lever at a point at the opposite side of the barrel from said fixed arm, a link extending between the operating lever and the second end of the rock arm, said link being pivoted at related ends to the second end of the rock arm and to the operating lever at a point spaced from the first end of the operating lever, a shoulder on the barrel to be engaged by the stationary lever, locking means mounted on the operating lever and extending into engagement with a part of the stationary lever for locking the operating lever in compressed relation toward the stationary lever, a resilient plug circumposed on said first end portion of the rod, and means for compressing said plug endwise as the levers are compressed together and said rod is moved in the barrel in the direction of the second end of the barrel.

2. In a pipe plug, a barrel having an axial bore and first and second ends to which the bore opens, a rod sliding in said bore and having a first end portion extending beyond said first end of the barrel, said rod having a second end, a threaded axial bore in said rod opening to said second end, a stem having a first end threaded in said threaded bore and a second end extending beyond said second end of the barrel, a transverse rock arm pivoted intermediate its ends on the second end of the stem, said rock arm having first and second ends, a relatively stationary lever having first and second end portions, said first end portion extending along side of the barrel and terminating in a fixed lateral arm pivoted to the first end of the rock arm, an operating lever having first and second ends with its first end pivoted to the first end portion of the stationary lever at a point at the opposite side of the barrel from said fixed arm, a link extending between the operating lever and the second end of the rock arm, said link being pivoted at related ends to the second end of the rock arm to the operating lever at a point spaced from the first end of the operating lever, a shoulder on the barrel to be engaged by the stationary lever, locking means mounted on the operating lever and extending into engagement with a part of the stationary lever for locking the operating lever in compressed relation toward the stationary lever, a resilient plug circumposed on said first end portion of the rod, and means for compressing said plug endwise as the levers are compressed together and said rod is moved in the barrel in the direction of the second end of the barrel, said locking means comprising a locking arm pivoted on said operating lever at a point spaced at the opposite side of said link from the pivotal connection of the levers, said locking arm having ratchet teeth therealong and having a free end, and a spring-pressed ratchet dog pivoted on said second end portion of the stationary lever releasably engaged with teeth on the locking arm.

References Cited in the file of this patent
UNITED STATES PATENTS

| | | |
|---|---|---|
| 586,438 | Inshaw | July 13, 1897 |
| 1,278,100 | Bruning | Sept. 10, 1918 |
| 2,370,776 | Carlson | Mar. 6, 1945 |
| 2,535,403 | Froggott | Dec. 26, 1950 |
| 2,687,268 | Hawes | Aug. 24, 1954 |
| 2,725,112 | Weisman et al. | Nov. 29, 1955 |
| 2,750,601 | Houle | June 19, 1956 |